June 28, 1960

A. DUERKSEN ET AL 2,942,295

DEVICE TO AUTOMATICALLY CENTER A TIRE IN A RETREADING MOLD

Filed May 7, 1956

INVENTORS
Arnold Duerksen
Ernst Roesch
BY
ATTYS

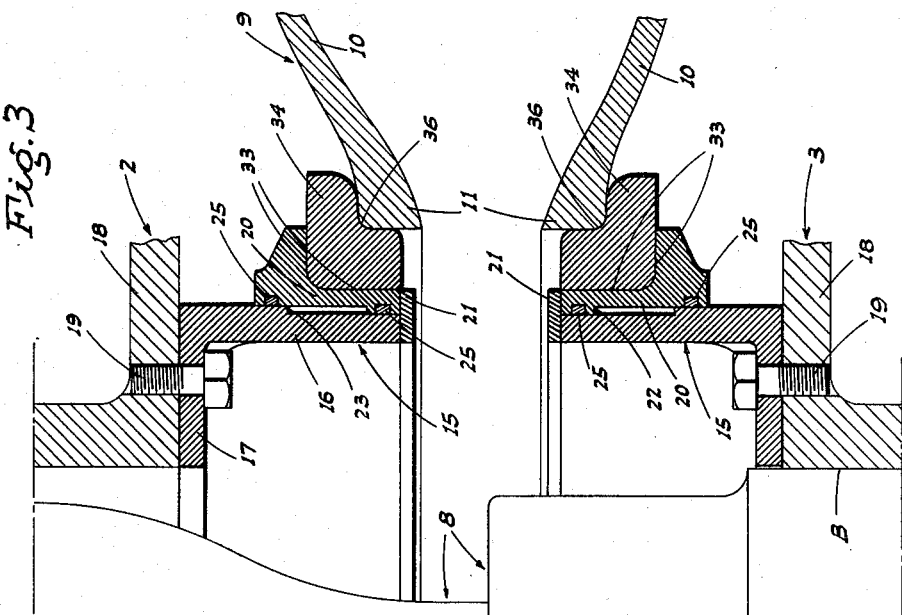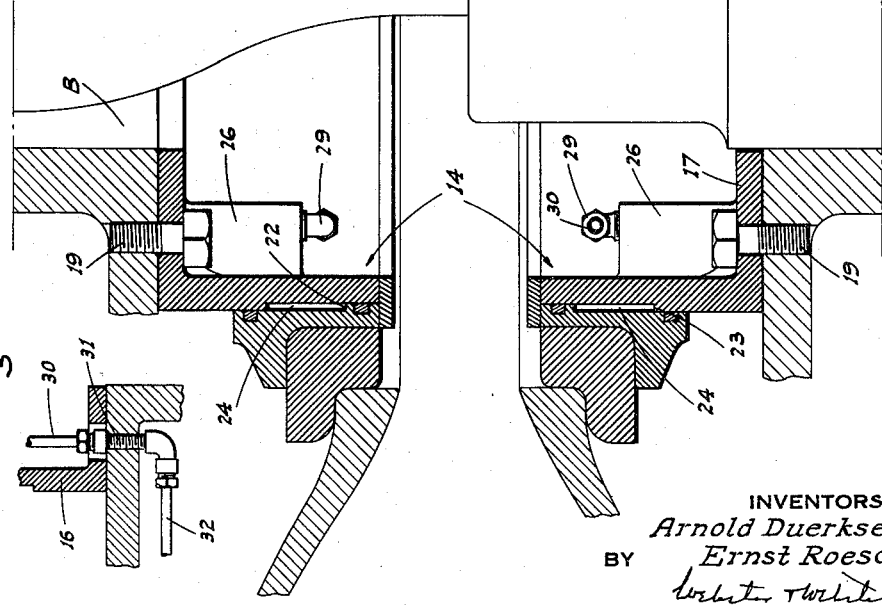

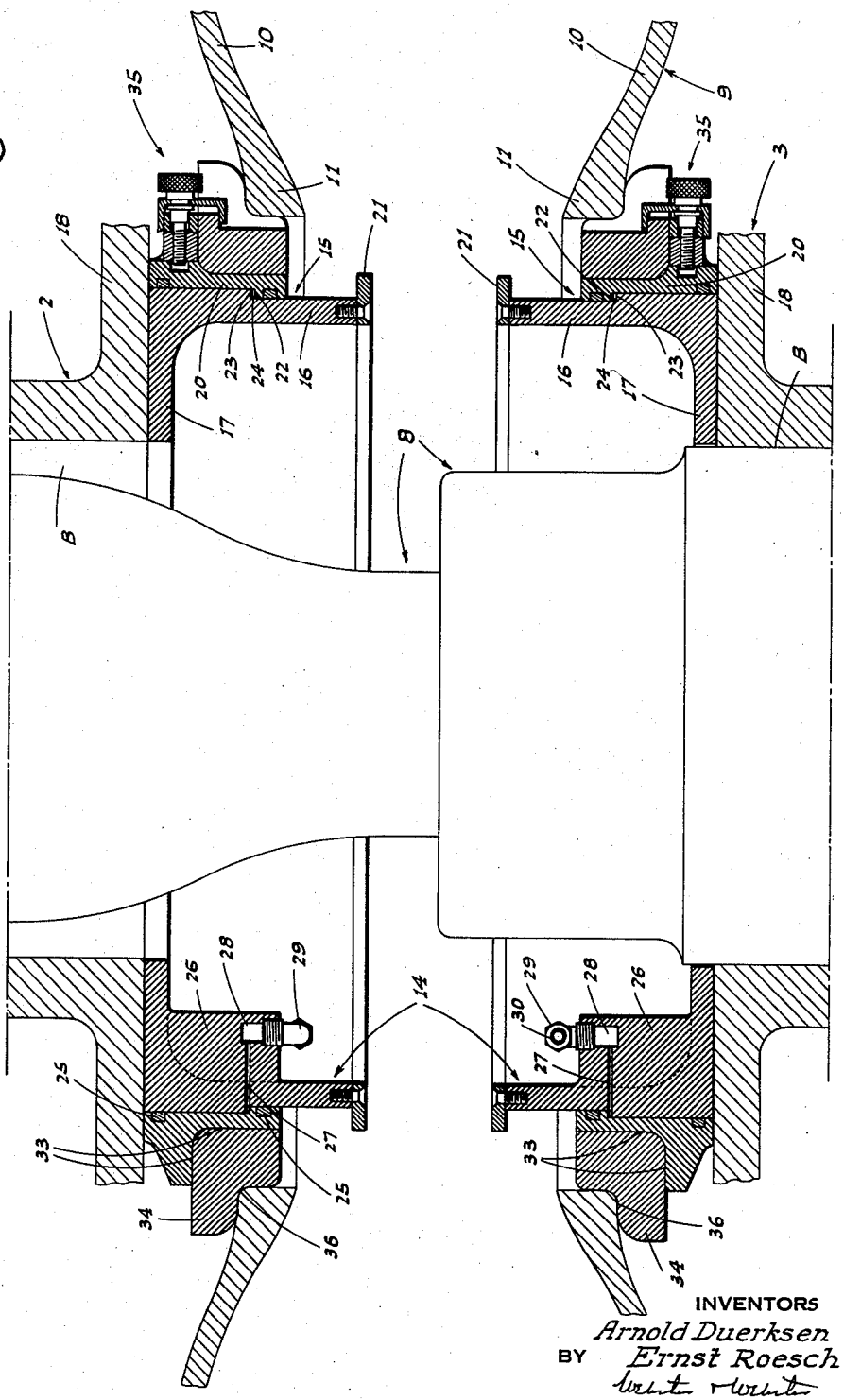

United States Patent Office 2,942,295
Patented June 28, 1960

2,942,295
DEVICE TO AUTOMATICALLY CENTER A TIRE IN A RETREADING MOLD

Arnold Duerksen and Ernst Roesch, Lodi, Calif., assignors to Super Mold Corporation of California, Lodi, Calif., a corporation of California Filed May 7, 1956, Ser. No. 583,112

11 Claims. (Cl. 18—18)

This invention is directed to, and it is a major object to provide, a novel device adapted for inclusion in a tire retreading mold for the purpose of automatically and properly positioning and centering the tire tread in the matrix for vulcanization; the term "retreading" being understood to include tire tread replacement by so-called "top capping" or "full capping."

The present device is adapted for use in a tire retreading mold which includes a body provided with a vulcanizing matrix adapted to surround the crown of a tire; there being an inflatable curing bag disposed in the tire and backed by an inside curing rim. When such curing bag is inflated, the pressure thereof urges the new tread material on the tire into positive contact with the matrix for proper vulcanization, but in the absence of a centering device the tire and its tread frequently tend to skew in the mold under the influence of the expansion of the curing bag. When this occurs an off-center tread results.

The tire beads remain free of the mold body, and upon inflation of the curing bag, and resultant expansion of the tire, the tire sidewalls tend to draw about the edges of the inside curing rim, and the beads to relatively separate axially of the mold. If such relative axial separation of the beads is not equal, the tire skews in the mold. However, by imposing a yieldable and substantially equal force against the tire beads from the outside, such beads separate to substantially like extent, and the tire—including the tread—is consequently automatically centered in the mold.

A tire tread centering device which so functions is illustrated in United States Patent No. 2,734,225, but in that embodiment the included tire bead engaging rings were yieldably urged toward each other by centrally disposed, opposed, fluid pressure power cylinders which had substantial projection from the mold in an axially outward direction. In certain types of molds, as where a center locking bolt is employed between the body sections—and as shown, for example, in our copending application for United States patent, Serial No. 566,840, filed February 21, 1956, now Patent No. 2,812,547, issued Nov. 12, 1957—the tread centering device of the above identified patent cannot be employed; this for the reason that the locking bolt likewise is in a central or axial position.

It is therefore another important object of this invention to provide a tire tread centering device wherein the tire bead engaging rings are carried on what may be termed "annular type" power cylinders mounted on corresponding body sections and constructed so that the same remain open and unobstructed at the center for passage of the locking bolt when the mold is closed.

An additional object of the invention is to provide a tire tread centering device, as above, wherein said annular type power cylinders are relatively short axially and can thus be readily mounted in the mold in the limited space which exists between the body sections thereof.

A further object of the invention is to provide a tire tread centering device wherein each of said annular type power cylinders is of novel yet simplified construction, and which can be manufactured with ease and economy, and conveniently installed in a tire retreading mold.

Still another object of the invention is to provide a practical, reliable, and durable tire tread centering device, and one which will be exceedingly effective for the purpose for which it is designed.

These objects are accomplished by means of such structure and relative arrangement of parts as will fully appear by a perusal of the following specification and claims.

In the drawings:

Fig. 3 is an enlarged sectional elevation of the tire tread centering device as mounted in the mold and cooperating with the tire beads; the view being taken on line 3—3 of Fig. 2, and showing the tire bead engaging rings at their starting position.

Fig. 4 is a similar view, but taken on line 4—4 of Fig. 2 and showing the tire bead engaging rings as separated to maximum extent.

Fig. 5 is a fragmentary radial section taken on line 5—5 of Fig. 2.

Figure 1:
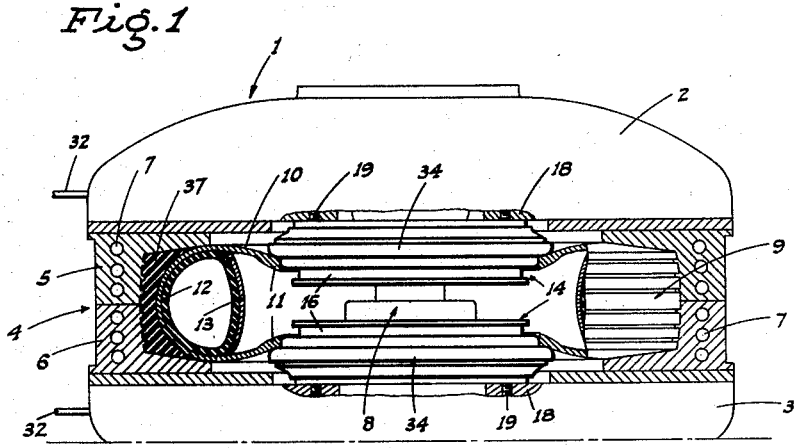
Fig. 1 is an elevation of the tire tread centering device as mounted in a tire retreading mold and in engagement with the beads of a tire in such mold; the latter and the tire being partly broken away and in section.
Figure 2:
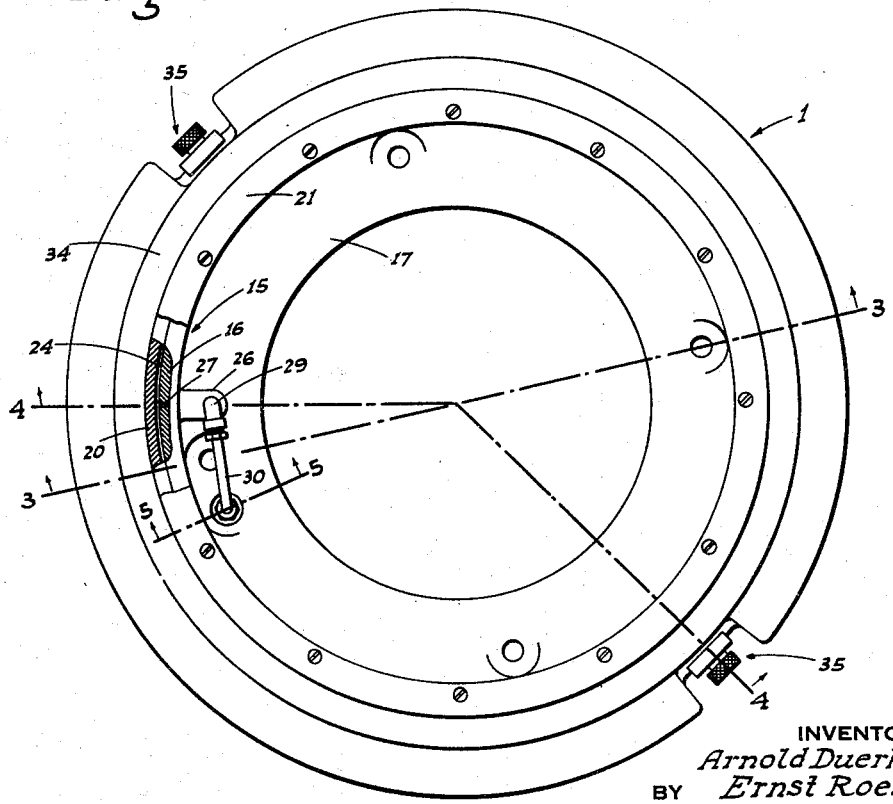
Fig. 2 is a plan view, detached, of one of the annular type power cylinders and the included tire bead engaging ring.

Referring now more particularly to the drawings and to the characters of reference marked thereon, the tire tread centering device is here illustrated as embodied in a tire retreading mold of generally clamshell type, and as illustrated—for example—in our copending application for United States Letters Patent, Serial No. 566,840, filed February 21, 1956, now Patent No. 2,812,547, issued November 12, 1957.

Such mold, which is indicated generally at 1, includes an upper body section 2 and a lower body section 3; such body sections, when closed, being disposed in spaced parallel relation and then confining or clamping therebetween the matrix assembly, indicated generally at 4, and which includes an upper matrix half 5 and a lower matrix half 6. These matrix halves are attached to the corresponding body sections, and are heated by suitable means, such as steam pipes 7 cast therein.

The body sections 2 and 3, together with the matrix assembly 4, are secured together in closed position—when the mold is in use—by a center locking bolt unit, indicated in part at 8; said body sections having central bores B for the passage of said bolt unit.

When the mold 1 is closed, the tire 9 is confined—at the crown portion—in the annular channel defined by the matrix assembly 4; the tire sidewalls being indicated at 10, and the beads at 11.

An inflatable curing bag 12 is disposed in the tire, and is backed by an inside curing rim 13; the portion of the tire sidewalls 10 radially inwardly of the inside curing rim 13, as well as the beads 11, being free of the related body sections 2 and 3.

This essentially is the structure of the tire retreading mold in which the tire tread centering device, indicated generally at 14, is mounted; such device comprising the following:

A pair of opposed or facing annular type power cylinders, indicated generally at 15, are disposed within the mold between the body sections 2 and 3 in concentric relation to the bores B; said power cylinders each being attached to the corresponding body section, as will hereinafter appear.

As the annular type power cylinders 15 are duplicates of each other, save being opposed or facing, a description of one will suffice for both.

Each annular type power cylinder 15 comprises a fixed, cylindrical drum or sleeve 16 which projects inwardly from the related body section 2 or 3 in concentric relation to the axis of bore B, but spaced radially outwardly therefrom. The fixed cylindrical drum or sleeve 16 is relatively short axially; i.e., does not extend quite half the distance between the body sections 2 and 3 when the mold 1 is closed.

At its axially outermost end the sleeve 16 includes an integral, inturned flange 17 which abuts an adjacent and corresponding flange 18 of the related body section 2 or 3; such flanges being fixedly connected by attachment bolts 19. This rigidly supports the sleeve 16 in connection— and for movement—with the related body section.

An external slide ring 20 surrounds the sleeve 16 for movement thereon; such slide ring being of lesser axial extent than such sleeve in order to permit of considerable motion of said slide ring between an annular stop 21 on the free end of such sleeve, and the flange 18 which serves as an opposed stop at the other end of the sleeve.

The sleeve 16 on the outside and the slide ring 20 on the inside are step-cut at certain points and in opposition so as to define—between facing shoulders 22 and 23— an endless or circumferential expansion chamber 24. On its inner face, and on opposite sides of the expansion chamber 24 the slide ring 20 carries full-circle seals 25 which bear against, and ride on, the adjacent face of the sleeve 16. The expansion chamber 24 is of maximum extent axially of the device when the slide ring 20 is in abutment with the stop 21, and of minimum extent when said slide ring is in abutment with the flange 18.

A fluid under pressure, such as air, is adapted to be fed to the expansion chamber 24 by means of a valve controlled, fluid pressure conduit system which includes the following:

At one point in the circumference thereof, and on the inside, the sleeve 16 is formed with an integral boss 26, and a radial passage 27 is formed in such boss; such passage communicating between the endless or circumferential expansion chamber 24 and a bore 28 in said boss 26. A fitting 29 is threaded into the bore 28, and such fitting is coupled by a pipe 30 which leads to another fitting 31 which extends through the flanges 17 and 18, there coupling to another pipe 32 which leads out of the related body section of the mold.

The pipe 32 communicates with a source of fluid pressure, the flow of which is controlled in said pipe 32 by a valve (not shown).

The external slide ring 20 is formed with a substantially right-angle, annular seat 33 in which a tire bead engaging ring 34 is received in matching relation. Such tire bead engaging ring 34 is initially separate, and is removably mounted in connection with the slide ring 20, in proper position, by clamping devices 35 engaged between said slide ring 20 and tire bead engaging ring 34 at opposed points; i.e., 180 degrees apart.

By use of the clamping devices 35 one tire bead engaging ring 34 can be removed and another—for a different tire size—replaced.

The tire bead engaging ring 34 is formed, at its outer corner, with a substantially right-angle, tire bead engaging seat 36, and in which seat the adjacent tire bead 11 is received in matching relation; such tire bead being abutted by the seat both on the outside and at the foot.

The above described tire tread centering device functions in the following manner:

A tire 9, with the inside curing bag 12 and inside curing rim 13 therein, is first disposed in the lower matrix half 6 with the mold open; the mold then being closed to bring the upper matrix half 5 into matching engagement with said lower matrix half 6, confining the tire in the thus formed annular channel of the mold, and whereupon the body sections 1 and 2 are locked together by the center bolt unit 8.

Prior to closing the mold, as above, the annular type power cylinders 15 are energized by the introduction of fluid, under substantially equal pressure, into the endless or circumferential expansion chambers 24, and which results in the slide rings 20 and related tire bead engaging rings 34 being urged axially inwardly or toward each other to the maximum extent of their movement; i.e. to a position against the stops 21.

The slide rings 20 thus move axially inwardly on the sleeves 16 much in the nature of a piston, with said sleeves being comparable to a fixed cylinder.

With the annular type power cylinders 15 thus energized, the tire beads 11 engage in the seats 36 of the rings 34 as the mold is closed; the tire beads—with such closing—being moved to some extent equally toward each other.

Thereafter, the inside curing bag 12 is inflated, and with such inflation the tire is substantially expanded so that the new tread rubber or camelback 37 is forcefully urged radially outwardly into the matrix assembly 4.

At the same time the tire side walls 10 tend to draw about the adjacent edges of the inside curing rim 13, and the beads separate in a direction axially of the mold, which separation is yieldably resisted by the tire bead engaging rings 34. Such yieldable resistance is attained by the use of the annular type power cylinders 15, wherein the fluid pressure in the expansion chambers 24 resists axially outward movement of the slide rings 20.

Thus, while the beads 11 can separate under the influence of the inflation of the inside curing bag 12, such separation is—by reason of the equal yieldable resistance of the annular type power cylinders 15—controlled likewise to equal extent. As a result, the tire 9—and particularly the new tread rubber or camelback 37—is effectively and accurately centered in the mold at the inception of the vulcanizing operation.

The extent to which the external slide rings 20 move on the sleeves 16 in a separating direction is of course dependent on the corresponding movement of the beads 11; the maximum separation of said slide rings being reflected in Fig. 4, and wherein said rings are shown in abutment with the flanges 18.

After the vulcanizing operation is initiated, the annular type power cylinders 15 may remain energized, or—if desired—the fluid pressure may be relieved from the expansion chambers 24.

It is also to be noted that after the vulcanizing operation is complete and the mold opened—and at which time the uppermost annular type power cylinder 15 moves away from the tire—re-energization of the lowermost annular type power cylinder 15 will aid in the removal of the tire from the lower matrix half 6, and in which it remains upon such opening of the mold.

With the described tire tread centering device 14, a tire 9 is readily, positively, and accurately centered in the mold for vulcanization of the new tread rubber or camelback thereon; such result being accomplished wholly automatically when the mold is closed and the curing bag inflated.

Also, when the mold is initially closed, but before the curing bag is inflated, the device—as previously described—moves the tire beads 11 toward each other; this for the very useful purpose of decreasing the diameter of the tire so that the mold may close easily, without shearing off or displacing any of the new tread rubber or camelback.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A tread centering device, for a tire mold which includes a body having a matrix for the reception of a tire with the beads exposed; said device comprising axially movable members engaging corresponding tire beads from the outside, the body including axially spaced sections, an axially inwardly extending guide sleeve fixed to each body section in concentric relation to its axis, a slide ring on each sleeve, each slide ring having the corresponding tire bead engaging member thereon, and means acting between each sleeve and the related slide ring operative to yieldably resist separation of said tire bead engaging members axially of the mold.

2. A tread centering device, as in claim 1, in which said means comprises portions of each sleeve and slide ring forming an expansion chamber therebetween, and a fluid pressure supply conduit connected to each such chamber; said portions being arranged so that the slide rings are yieldably urged toward each other upon introduction of fluid pressure into said chambers.

3. A tread centering device, for a tire mold which includes a body having a matrix for the reception of a tire with the beads exposed; said device comprising annular axially movable members engaging corresponding tire beads from the outside, a pair of facing, annular-type power cylinders mounted in connection with the body concentric to its axis and laterally inward of the opposed outer faces thereof, said cylinders each including a fixed part and a sliding part, the sliding parts moving toward each other upon energization of said power cylinders, and means to introduce fluid pressure into the power cylinders to energize the same; the tire bead engaging members being mounted on corresponding sliding parts of said cylinders.

4. A tread centering device, as in claim 3, in which each of said fixed parts is a sleeve whose diameter is greater than its axial extent, and each sliding part is a slide ring carried by the related sleeve; the tire bead engaging members arcuately matching said rings.

5. A tread centering device, for a tire mold which includes a body having a matrix for the reception of a tire with the beads exposed, and axially spaced body sections disposed outwardly of said beads; a pair of facing annular-type power cylinders disposed in the space between the body sections concentric to the body axis, each power cylinder including a fixed part secured at its adjacent end to the related body section, an axially sliding part on each fixed part, the tire bead engaging members being mounted on corresponding sliding parts, the sliding parts moving toward each other upon energization of said power cylinders, and means to introduce fluid pressure into the power cylinders to energize the same.

6. A tread centering device, as in claim 5, in which each fixed part is a sleeve and each sliding part a slide ring on the corresponding sleeve; the tire bead engaging members being initially separate rings removably mounted on the corresponding slide rings.

7. A tread centering device, as in claim 5, in which each body section includes a central bore, the fixed parts being sleeves having matching bores, and the sliding parts being external slide rings.

8. A tread centering device, as in claim 5, in which the fixed parts are sleeves, radial flanges on the axially outer ends of the sleeves abutting and secured to adjacent portions of the corresponding body sections, and stops on the axially inner ends of the sleeves; the axially sliding parts being slide rings on the sleeves but of lesser axial extent whereby to permit of sliding motion of each of the latter between the related stop and body section portion.

9. A tread centering device, for a tire mold which includes a matrix for the reception of a tire with the beads exposed; said device comprising a pair of annular-type open-center power cylinders disposed in facing relation concentric to the tire adjacent the beads, means mounting said power cylinders in connection with the matrix, each cylinder including a sliding part movable axially inwardly upon energizatoin of said cylinder, and tire bead engaging members on said sliding parts.

10. A device, as in claim 1, in which each sleeve is secured to and projects laterally inwardly from the laterally inner face of the related body section.

11. A tread centering device for a tire mold which includes a matrix for the reception of a tire with the beads exposed; said device comprising annular members to engage the tire beads from the outside, rings on which said members are mounted, open-center sleeves on which the rings are slidable, means mounting the sleeves in fixed relation to the matrix axially thereof, and an axially expansible pressure chamber formed between each sleeve and the related ring and arranged so that upon the admission of fluid under pressure to such chamber, said related ring will move axially toward the other ring.

References Cited in the file of this patent
UNITED STATES PATENTS

| | | |
|---|---|---|
| 2,672,651 | Smyser | Mar. 23, 1954 |
| 2,734,225 | Glynn | Feb. 14, 1956 |